United States Patent [19]

King et al.

[11] Patent Number: 5,367,999
[45] Date of Patent: Nov. 29, 1994

[54] METHOD AND SYSTEM FOR IMPROVED FUEL SYSTEM PERFORMANCE OF A GASEOUS FUEL ENGINE

[75] Inventors: Steven R. King; Michael W. Walser, both of Ft. Worth, Tex.

[73] Assignee: Mesa Environmental Ventures Limited Partnership, Fort Worth, Tex.

[21] Appl. No.: 48,839

[22] Filed: Apr. 15, 1993

[51] Int. Cl.$^5$ .................. F02M 55/00; F02M 21/04
[52] U.S. Cl. ........................... 123/458; 123/527
[58] Field of Search ............... 123/458, 527, 27 GE, 123/DIG. 12

[56] References Cited

U.S. PATENT DOCUMENTS

| | | | |
|---|---|---|---|
| 4,141,326 | 2/1979 | Wolber | 123/DIG. 12 |
| 4,364,364 | 12/1982 | Subramaiam | 123/527 |
| 4,606,322 | 8/1986 | Reid et al. | 123/458 |
| 5,105,791 | 4/1992 | Nye, Jr. | 123/527 |
| 5,117,798 | 6/1992 | Nozaki | 123/27 GE |
| 5,150,685 | 9/1992 | Porter et al. | 123/527 |
| 5,183,011 | 2/1993 | Fujii et al. | 123/DIG. 12 |

FOREIGN PATENT DOCUMENTS

0064373  11/1982  European Pat. Off. ........ 123/527

*Primary Examiner*—E. Rollins Cross
*Assistant Examiner*—Evick Solis
*Attorney, Agent, or Firm*—Baker & Botts

[57] ABSTRACT

An improved gaseous fuel delivery system and method (10) to improve performance of a gaseous fuel engine (30) by variably maintaining gaseous fuel pressure to the gaseous fuel engine (30). From a storage device (12), gaseous fuel flows to fuel pressure regulator (16) that variably and dynamically reduces the fuel pressure from the storage pressure and maintains the gaseous fuel pressure at the desired controlled supply pressure. Regulator controller (20) controls the fuel pressure regulator (16) in response to signal inputs (28, 34, 44, and 54) and maintain the gaseous fuel at the controlled supply pressure. Signal inputs (28, 34, 44, and 54) used by regulator controller (20) are derived from sensors such as fuel pressure sensor (24) an engine speed and/or intake manifold pressure sensor (34), fuel temperature sensor (42), and fuel composition sensor (52). The result is substantially improved fuel system dynamic range and the ability to control gaseous fuel supply to the gaseous fuel engine to provide improved fuel metering accuracy and improved engine performance and emissions.

58 Claims, 5 Drawing Sheets

METHOD AND SYSTEM FOR IMPROVED FUEL SYSTEM PERFORMANCE OF A GASEOUS FUEL ENGINE

TECHNICAL FIELD OF THE INVENTION

The present invention generally relates to fuel metering systems and, more particularly, to a method and system that provide improved accuracy and performance in precisely regulating the flow rate of compressed natural gas, propane gas, and other gaseous fuels to gaseous fuel engines.

BACKGROUND OF THE INVENTION

At present, the United States holds large and available natural gas, propane, and other gaseous fuel resources. These types of fuel are particularly attractive due, in part, to the significantly reduced emissions that gaseous fuel engines produce relative to those of liquid fuel engines. Gaseous fuel automotive engines, therefore, present an attractive option for automotive vehicles. If appropriate technology existed to effectively and efficiently use gaseous fuels, then a much wider variety of fuel options could be available to power automotive engines. Most known automotive engine technology for improved engine performance, however, applies to liquid fuel systems.

One broad technological area in which automotive gaseous fuel engines need substantial improvement is in fuel metering, i.e., the technology of precisely controlling the flow rate of fuel to the engines. Specific areas of fuel metering technology in which needs exist include (1) increasing the dynamic range of the gaseous fuel flow; (2) compensating for temperature changes in the gaseous fuel; (3) compensating for fuel composition changes in gaseous fuels; and (4) compensating for a phenomenon known as "regulator droop" as the fuel flows to the gaseous fuel engine.

The problem of fuel flow dynamic range may be seen in the example of one commercially-available automobile engine that uses compressed natural gas. That engine suffers in fuel metering performance at both ends of its metering dynamic range. At the low end of the dynamic range, i.e., when delivering small amounts of fuel to the engine, fuel system performance is unstable. This, in turn, makes engine performance unstable. At the other end of the dynamic range, the amount of gaseous fuel that the system can deliver to the engine is limited. Since the amount of gaseous fuel to the engine is limited, the power that the engine produces is also limited. Consequently, existing gaseous fuel engines of this type are less stable when idling and have lower peak torque and power at maximum speed than their liquid fuel counterparts Compensating for temperature changes is of particular importance in engine systems that have been converted, either as part of their manufactured design or in the automotive aftermarket, to use compressed natural gas or other gaseous fuels. These OEM engine systems require temperature compensation because their performance may vary drastically depending on whether the gaseous fuel is hot or cold. No known method or system permits this type of compensation for the purpose of improved fuel metering and system performance in a gaseous fuel engine system that was not originally designed with temperature compensation capability.

The composition of gaseous fuels is known to vary significantly around the United States. In "The Impact of Natural Gas Composition on Fuel Metering and Engine Operational Characteristics," International Congress & Exposition, Detroit, Mich., Feb. 24–28, 1992, Soc. of Automotive Eng'rs, Paper No. 920593 by Steven R. King, one of the present co-inventors, appears an explanation of the effects of gaseous fuel composition on gaseous fuel engines. At present, no known method or system exists that compensates for these variations in gaseous fuel properties The phenomenon known as "regular droop" poses yet another area of gaseous fuel metering technology in which significant limitations currently exist. Regulator droop may be characterized as a drop in fuel outlet pressure that occurs in a regulator as the gaseous fuel flow rate increases. At low flow rates, most regulators comfortably maintain a constant gaseous fuel outlet pressure. As flow rates increase, however, fuel outlet pressure becomes increasingly difficult to maintain due to mechanical design limitations within the regulator. This effect limits the operation of the gaseous fuel engine by reducing the quantity of fuel that can be supplied to the engine. No method or system, however, exists to solve this problem.

Since no method or system exists to separately solve any of the above problems, none exists to solve any combination of them. Moreover, for efficient operation of an automotive gaseous fuel engine, it is important that engine designers have solutions to the majority, and preferably all, of these limitations.

Consequently, there is a need for a gaseous fuel delivery method and system that provides to a gaseous fuel engine a wide dynamic range of fuel flow. Such a method and system for metering gaseous fuel to gaseous fuel engines would improve engine stability at low engine speeds and allow more fuel to reach the engine to thereby increase maximum engine power.

There is a need for an improved fuel metering method and system that compensates for temperature changes in the gaseous fuel as it flows to the gaseous fuel engine.

There is a further need for a method and system that determines and compensates for fuel composition variations in gaseous fuel so as to generally improve the performance of the gaseous fuel engine.

There is yet a need for a fuel metering method and system that avoids regulator droop as gaseous fuel flows to the gaseous fuel engine.

SUMMARY OF THE INVENTION

The present invention, accordingly, provides a method and system for improving fuel system performance on a gaseous fuel engine that overcomes or reduces disadvantages and limitations associated with prior gaseous fuel delivery methods and systems.

One aspect of the invention is a system having improved fuel system performance for an automotive engine that uses gaseous fuel such as compressed natural gas. The system includes a fuel storage device for storing the gaseous fuel at a storage pressure. A fuel pressure regulator receives the gaseous fuel from the fuel storage device to variably reduce the pressure of the gaseous fuel from the storage pressure to a controlled supply pressure to the engine. A regulator controller controls the variable fuel pressure regulator in response to input signals that direct the variable fuel pressure regulator to maintain the gaseous fuel at the controlled supply pressure. The regulator controller operates in response to a pre-determined set of parameters. The parameters may be, for example, engine speed, engine intake manifold pressure, fuel supply pressure, fuel supply temperature, and fuel supply composition.

According to another aspect of the invention, there is provided a method and system that improve fuel metering accuracy for gaseous fuel engines. This improved metering accuracy generally benefits engine performance and lowers emissions relative to existing gaseous fuel metering systems and methods. The system includes a variable fuel pressure regulator that can be controlled hydraulically, electro-hydraulically, pneumatically, electro-pneumatically, mechanically, or electro-mechanically. The variable fuel pressure regulator controls the fuel supply pressure to the fuel metering system to a pressure defined by the operator. This "smart regulator" permits controlling the fuel supply pressure to the fuel metering valves of the associated fuel injector to increase the dynamic flow range of the fuel system, for fuel supply temperature compensation, for fuel composition variation compensation and to eliminate regulator droop, as well as to compensate or correct for any number of these problems.

BRIEF DESCRIPTION OF THE DRAWINGS

The invention and its modes of use and advantages are best understood by reference to the following description of illustrative embodiments when read in conjunction with the accompanying drawings, wherein.

DETAILED DESCRIPTION OF THE INVENTION

The illustrative embodiments of the present invention are best understood by referring to the FIGUREs, wherein like numerals are used for like and corresponding parts of the various drawings.

As compressed natural gas and other gaseous fuels become viable options for automotive engines, fuel metering systems are desirable that permit these engines to achieve certain emission standards and objectives as well as to provide high engine performance. Gaseous fuel injectors that use pulse-width-modulated solenoid valves require as much as ten (10) times the orifice area to flow the gaseous fuel as is necessary for liquid gasoline injectors to provide an equivalent amount of fuel to the engine. Thus, a gasoline fuel injector has a comparatively small flow orifice relative to the fuel injector for a gaseous fuel engine. With the larger orifice, the armature within the fuel injector has a significant mass and requires a considerable amount of power to open quickly. A result is a large mass within the fuel injector that oscillates back and forth during gaseous fuel engine operation.

The larger orifice and armature of the gaseous fuel injector has certain limitations. For example, gaseous fuel is supplied at a pressure that is generally higher than that of a liquid gasoline engine. Gaseous fuel engines typically have fuel pressures ranging between 100 and 200 psi, while liquid gasoline engines operate at pressures between 30 and 45 psi. Since fuel pressure tends to hold the injector shut, the mechanical responsiveness of the armature in flowing gaseous fuel past the fuel injector orifice is less than with the smaller orifice and armature for a liquid gasoline fuel injector. This reduces the dynamic range of the injector by requiring increased time to open, thus increasing the minimum opening time of the injector.

Liquid fuel density does not change significantly with temperature or pressure changes. This is not the case with a gaseous fuel system. Gaseous fuel density does change significantly with temperature or pressure changes. This, in turn significantly affects fuel flow rates. The present invention, therefore, uses the fuel's gaseous pressure as an additional control parameter. Gaseous fuel is significantly more compressible than is liquid fuel. Therefore, it is possible to control the pressure of the gaseous fuel passing to the fuel injector and, thereby, increase the dynamic range of a gaseous fuel delivery system for a gaseous fuel engine. The present invention takes advantage of this gaseous fuel property.

One embodiment of the present invention includes a fuel storage device (e.g., a compressed natural gas cylinder, LPG tank, or LNG tank), a fuel pressure regulator, a regulator controller, an engine fuel control system, and the gaseous fuel engine itself. The gaseous fuel is supplied to the fuel pressure regulator at a pressure determined by the state of the fuel in the storage device. For compressed natural gas storage, this pressure commonly may range from 100 psi to 3600 psi. Fuel pressure is then regulated down to the controlled supply pressure by the fuel pressure regulator for delivery to the engine. The regulator controller controls the fuel pressure regulator. Various sensors, including fuel supply pressure, fuel supply temperature, engine speed, and fuel composition may be used to provide input to the controller, depending on the application. The regulator controller determines the desired pressure setpoint based on input signals and user supplied information and then controls the regulator output pressure in response to these measurements. The fuel metering system on the engine then meters the proper amount of fuel to the engine at the controlled supply pressure.

Figure 1:
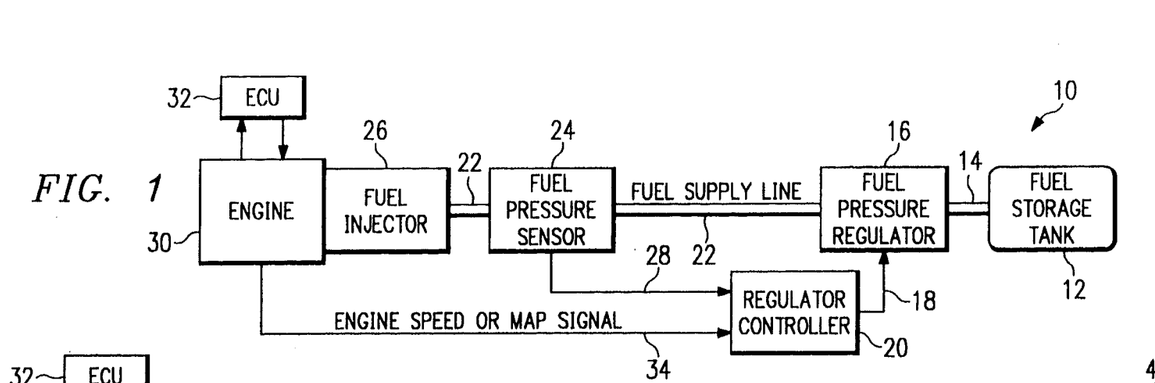
FIG. 1 illustrates a simplified block diagram of a first embodiment of the present invention for dynamically controlling gaseous fuel pressure to a gaseous fuel engine.

To illustrate this embodiment, FIG. 1 shows a simplified block diagram of gaseous fuel metering and delivery system 10 that is consistent with the concepts of the present invention. Beginning at fuel storage tank 12, fuel at a storage pressure is permitted to flow through passage 14 to fuel pressure regulator 16. Fuel pressure regulator 16 also receives a control signal 18 from regulator controller 20. Fuel pressure regulator 16, in response to control signal 18, controls the pressure of gaseous fuel that it sends to fuel supply line 22. This pressure shall hereinafter be called the "controlled supply pressure" of the gaseous fuel. Gaseous fuel from fuel supply line 22 flows past fuel pressure sensor 24 as it continues along fuel supply line 22 to reach fuel injector 26. In response to the sensed pressure of the gaseous fuel within fuel supply line 22, fuel pressure sensor 24 sends a sensed pressure signal 28 to regulator controller 20. Fuel injector 26 then controls the amount of compressed gaseous fuel that reaches engine 30. The amount of gaseous fuel that fuel injector 26 flows to engine 30 is controlled by instructions that engine control unit (ECU) 32 executes. In the illustrative embodiment 10 of FIG. 1, engine 30 may also provide either or both an engine speed and manifold absolute pressure (hereinafter MAP) signal 34 to regulator controller 20.

One method of operation for system 10 of FIG. 1 encompasses the idle and low engine speed and load situation. In this situation, the fuel controlled supply pressure is set low to allow the fuel injector 26 drive signal (i.e., the solenoid valve control signal pulse width) to increase relative to the mass of fuel that it would meter at a higher pressure. For example, if engine 30 requires 5 lb/hr fuel at idle and fuel injector 26 must be held open for 4 milliseconds per event to deliver that amount of fuel at 200 psia, then reducing the fuel pressure to 100 psia will require that the pulse width be increased to approximately 8 milliseconds to deliver the same amount of fuel. This provides more stable operation of fuel injector 26 and yields more accurate fuel metering to engine 30. As either or both engine 30 speed and MAP are increased, the fuel pressure is increased to provide partial compensation for the increased fuel demand by engine 30. Both increased fuel supply pressure and increased pulse width increase fuel flow. Controlling both (pulse width and fuel pressure) increases the fuel system dynamic flow range. This, in turn, increases the dynamic power range of the gaseous fuel engine 30.

One technical advantage of the embodiment of FIG. 1 is the ability to maintain fuel pressure at a pre-determined level for different engine speeds. To this end, pressure sensor 24 sends a fuel pressure signal input to regulator controller 20. Regulator controller 20 may then control fuel pressure regulator 16 to maintain constant pressure within fuel supply line 22 for all engine speeds and all manifold absolute pressures. This system, therefore, has use in avoiding the phenomenon known as "regulator droop" that exists in many gaseous pressure regulators. Regulator droop may be characterized as a drop in fuel pressure that occurs in a mechanical regulator as flow rate increases to provide more fuel to the gaseous fuel engine. At low flow levels it is possible to maintain a desired pressure level. As flow rate increases, however, it becomes increasingly difficult to maintain the desired pressure level. Fuel pressure regulator 16 of the preferred embodiment, therefore, maintains positive pressure control for all flow rates of gaseous fuel. Although avoiding regulator droop may not necessarily extend the dynamic range of the system, it maintains the dynamic range that is designed in the engine system. Therefore, fuel metering system performance and stability improve for all modes of engine operation.

Figure 2:
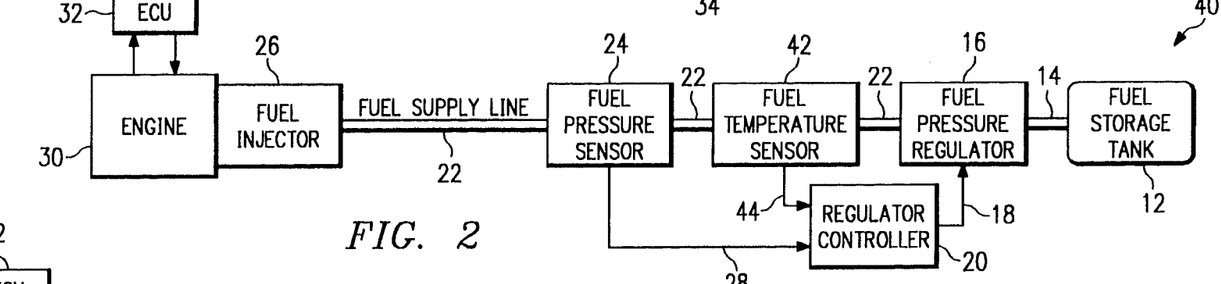
FIG. 2 illustrates a second embodiment of the present invention that includes fuel temperature sensing for variable fuel pressure regulator control.

FIG. 2 shows yet a further system 40 that combines fuel pressure sensing and temperature sensing to maintain accuracy in metering fuel to a gaseous fuel engine. In particular, gaseous fuel in fuel storage tank 12 flows along regulator supply line 14 to fuel pressure regulator 16. Fuel pressure regulator 16 receives control signals 18 from regulator controller 20. In response to control signals 18, fuel pressure regulator 16 outputs gaseous fuel along supply line 22 on which fuel temperature sensor 42 determines the fuel temperature and generates fuel temperature signal 44. Fuel pressure sensor 24 senses the fuel pressure in fuel supply line 22 to generate fuel pressure signal 28 into regulator controller 20. In response to both fuel temperature measurement 44 and fuel pressure measurement 28, regulator controller 20 sends a regulator control signal to fuel pressure regulator 16. These signals may be related to the density of the gaseous fuel passing through fuel supply line 22. Regulator controller 20 may then control fuel pressure regulator 16 to change the controlled fuel supply pressure to provide to fuel injector 26 fuel having a desired density. Fuel injector 26 then may provide this density of gaseous fuel to engine 30. Note that in the temperature compensated embodiment 40 of FIG. 2, it is not necessary to sense engine speed or manifold absolute pressure. Engine speed or manifold absolute pressure signals, however, could also be used for generating regulator control signal 18 to fuel pressure regulator 16.

System 40 of FIG. 2 addresses the fact that fuel supply pressure can be used to compensate for fuel supply temperature changes. Compressible flow principles provide a way to determine the corresponding change in fuel flow through the injector as a function of temperature change. Using a similar approach, the fuel supply pressure can then be adjusted to precisely offset the effect caused by the fuel temperature. For example, as the fuel supply temperature decreases, the mass fuel flow rate through the fuel injector will increase for a fixed injector pulse width. To offset the temperature effect, the fuel supply pressure may be decreased by an amount that will decrease the fuel flow rate through the injector by the same amount that the lower temperature increased the flow rate. In simplified terms and assuming ideal flow conditions, the relationship between pressure and temperature to maintain a constant mass fuel flow rate can be expressed as:

$$M_{std} \propto \frac{P_{std}}{P_{actual}} * \sqrt{\frac{T_{actual}}{T_{std}}} \quad (1)$$

where:
 $M_{std}$=mass fuel flow rate at standard
 P=pressure and temperature
 T=fuel supply pressure One envisioned method of operation for system 40 of FIG. 2 applies to originally-equipped (or OEM) control systems. These systems are designed for use with liquid fuels and do not provide fuel density compensation capability. Compensation for density change with a liquid fuel is not needed, since density does not change significantly with changing supply temperature. It is becoming a more common practice to use the OEM control system, in whole or part, as part of the conversion system to operate a vehicle on gaseous fuel. When such an OEM control system is adapted for use on a gaseous fuel, the ability to provide fuel density compensation is not available. As a result, fuel density variations can cause wide variations and inaccuracies in the quantity of fuel metered to the engine and result in increased emissions, lowered performance, and reduced fuel efficiency. System 40 of FIG. 2, therefore, overcomes these problems.

Figure 3:
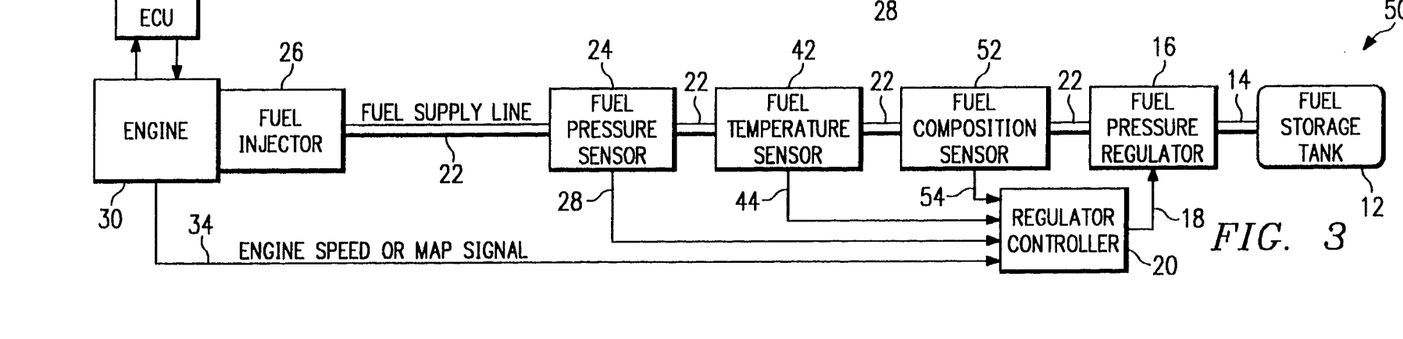
FIG. 3 provides another embodiment of the present invention that provides fuel supply pressure sensing, fuel supply temperature sensing, fuel supply composition sensing, engine speed sensing and manifold absolute pressure sensing to provide signal inputs for variably controlling fuel pressure to the gaseous fuel engine.

FIG. 3 illustrates yet a further embodiment of the present invention as system 50 for maintaining and controlling a desired fuel composition into gaseous fuel engine 30. In the FIG. 3 embodiment, fuel storage tank 12 provides gaseous fuel along supply line 14 to fuel pressure regulator 16. Fuel pressure regulator 16 responds to regulator control signal 18 from regulator controller 20 and in response thereto provides pressure regulated gaseous fuel to fuel supply line 22. Fuel composition sensor 52 senses the fuel composition of the gaseous fuel within fuel supply line 22 to generate fuel composition signal 54. Fuel temperature sensor 42 and fuel pressure sensor 24, respectively, generate fuel temperature signals 44 and fuel pressure signal 28 into regulator controller 20. Regulator controller 20 may also receive an engine speed or MAP signal 34 from engine 30.

The FIG. 3 embodiment, therefore, illustrates a further envisioned method of operating variable fuel pressure regulator 16 and associated system to provide fuel composition compensation. Fuel composition sensor 52 provides input 54 to regulator controller 20. Regulator controller 20, in turn, uses input 54 to generate control signal 18 for fuel pressure regulator. The effect of fuel composition variation on fuel demand by the engine and fuel metering through the injector can be determined using compressible flow theory. This technique is described in S. R. King, "The Impact of Natural Gas Composition on Fuel Metering and Engine Operational Characteristics", Int'l Cong.& Expos'n, Soc. Auto. Eng'rs, Detroit, Mich., Feb. 24–28, 1992, which is here expressly incorporated by reference. The fuel pressure can be varied and controlled to a pressure necessary to offset a change in fuel composition in much the same way as the pressure is varied to compensate for fuel temperature as described the system 40 of FIG. 2.

The control of fuel supply pressure that the present invention provides may be performed hydraulically, electro-hydraulically, pneumatically, elector-pneumatically, mechanically, electro-mechanically, or by any combination of these other methods. For exemplary purposes only, therefore, FIGS. 4 and 5, below, provide embodiments of the fuel pressure regulator 16, regulator controller 20, and related components for accomplishing this aspect of the present invention.

Figure 4:
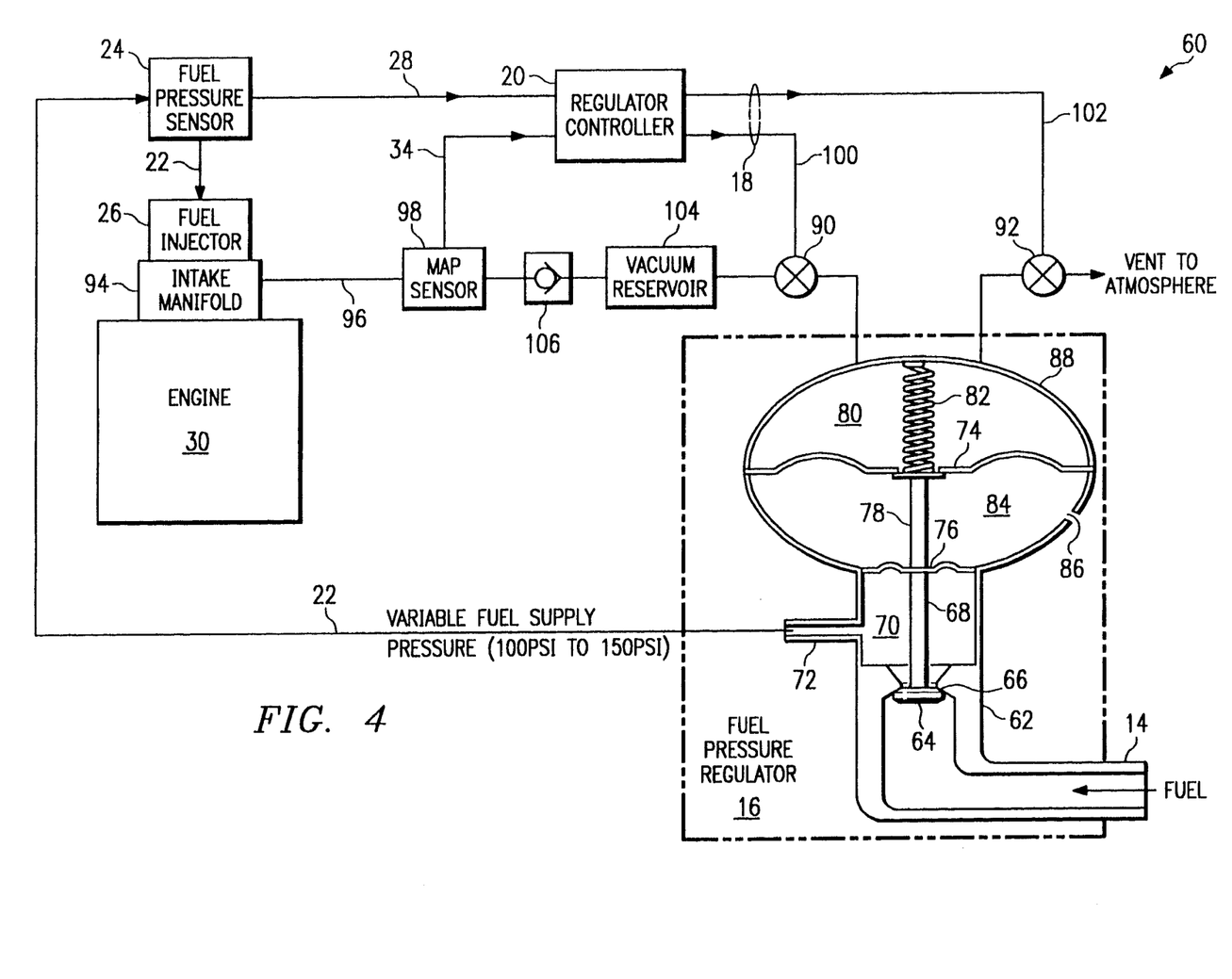
FIG. 4 provides a simplified block diagram of a variable fuel pressure regulator formed consistent with the concepts of the present invention.

FIG. 4 illustrates in more detail a block diagram of system portion 60 that is consistent with the embodiment 10 of FIG. 1. As FIG. 4 illustrates gaseous fuel passes through supply line 14 to fuel pressure regulator 16. Fuel pressure regulator 16 receives gaseous fuel from supply line 14 and controls fuel pressure using valve assembly 62. Valve assembly 62 includes valve head 64 and valve seat 66, the relative positions of which are controlled through actuator 68. In response to the position of valve head 64 relative to valve seat 66, gaseous fuel passes to outlet cavity 70. That is, as valve head 64 moves further from valve seat 66, more high pressure gaseous fuel passes from supply line 14 to variable fuel supply line 22. Outlet cavity 70 directs gaseous fuel via outlet 72 to variable fuel supply line 22. Actuator 68 is integral to valve head 64 and is controlled by the primary regulating diaphragm 76 and the movement of biasing diaphragm 74 to which actuator 68 attaches. Biasing diaphragm 74 of fuel pressure regulator 16 biases pressure of gaseous fuel to variable fuel pressure supply line 22. Spring 82 within cavity 80 attaches between casement 88 and biasing diaphragm 74. Cavity 84 vents to atmosphere. When no vacuum exists within cavity 80, spring 82 forces biasing diaphragm 74 downward causing valve head 64 to lift from seat 66 and pass fuel from inlet supply line 14 through regulator 16 to variable fuel supply line 22. When vacuum exists within cavity 80, biasing diaphragm 74 pushes upward. This upward movement causes valve stem 64 to engage valve seat 66.

The illustrative embodiment of fuel pressure regulator 16 in FIG. 4 may be formed by adapting an existing pressure regulator such as that sold by Mesa Environmental Ventures Limited Partnership and having product number REG-020-380. When using that device for the purposes of the present invention, the configuration of fuel pressure regulator 16 uses normal regulator diaphragm 76 to provide primary control of the position of actuator 68. Solenoid valves 90 and 92 control and maintain vacuum within cavity 80.

The gaseous supply line pressure, as described above, is sensed by fuel pressure sensor 24 prior to the gaseous fuel going to fuel injector 26. In response to the manifold absolute pressure level that MAP sensor 98 on line 96, MAP sensor 98 generates MAP signal 34 that goes to regulator control module 20. Similarly, pressure sensor 24 provides pressure signal 28 to regulator control module 20. As described briefly in connection with FIGS. 1 through 3 above, regulator control signal 18 controls the operation of fuel pressure regulator 16.

In the embodiment of FIG. 4, regulator control signal 18 takes the form of control signals 100 and 102 to solenoid valves 90 and 92, respectively. The vacuum in vacuum reservoir 104 provide a supply source of vacuum to operate regulator 16. The operation of check valve 106 ensures vacuum is maintained in reservoir 104. Thus, as solenoid valve 90 opens in response to control signal 100 from regulator control module 20, vacuum within cavity 80 increases. This causes upward movement of biasing diaphragm 74. Upward movement of biasing diaphragm 74 raises actuator 68 and causes valve stem 64 to seat within valve seat 66. This reduces gaseous fuel pressure to fuel injector 26.

Operation of section 60 of FIG. 4 may proceed as follows. Fuel at line 14 passes through fuel pressure regulator 16 to maintain a pressure in variable fuel supply line 22. Variable fuel supply line 22 sends the gaseous fuel past fuel pressure sensor 24 and into fuel injector 26. After passing through fuel injector 26, the fuel enters intake manifold 94. MAP sensor 98, using sensing line 96, senses the intake manifold 94 pressure. Upon measuring MAP 98 and fuel pressure 24, regulator controller 20 determines the desired change in supply pressure 22. If fuel supply pressure is too low, regulator controller 20 sends a close signal 100 to solenoid valve 90. This reduces the vacuum in cavity 80 of fuel pressure regulator 16. Spring 82 then forces biasing diaphragm 74 downward. This downward movement causes valve stem 64 to unseat to permit more gaseous fuel to pass to variable fuel supply line 22. This, in turn, causes a return to the desired fuel supply pressure in line 22 for achieving the desired condition in the gaseous fuel delivery system.

Figure 5:
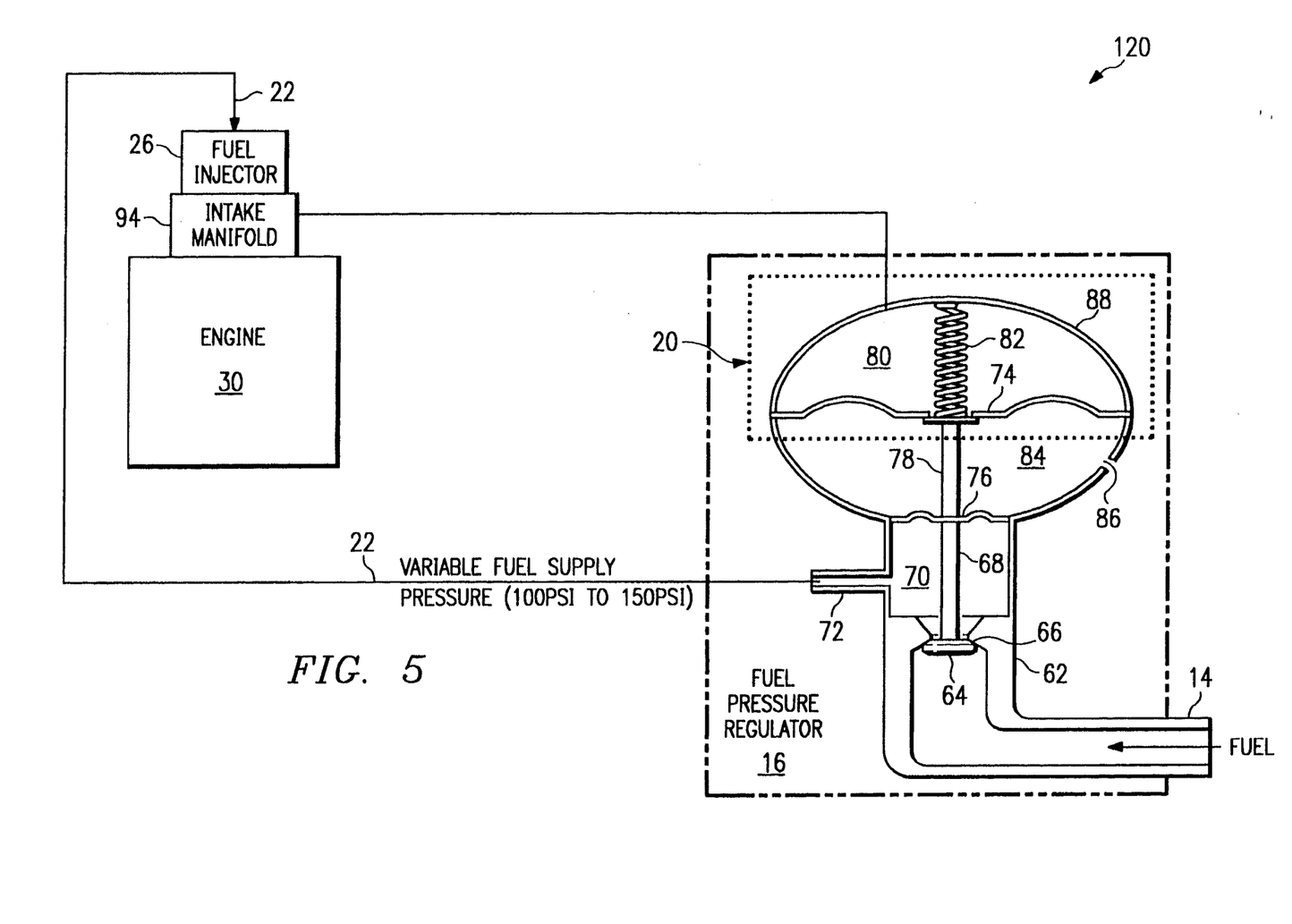
FIG. 5 shows a simplified block diagram of another embodiment of fuel pressure regulator formed consistent with the concepts of the present invention.

FIG. 5 shows a simpler configuration of regulator controller 20, fuel pressure regulator 16, and related components of the preferred embodiment than that of FIG. 4. Inventive concepts that the configuration of FIG. 5 embodies, however, are altogether similar to those of the FIG. 4 configuration. That is, the operation of fuel pressure regulator 16 is essentially the same in portion 60 of FIG. 4 as that of portion of 120 of FIG. 5. An apparent difference between the two configurations is that instead of regulator controller 20 taking inputs from fuel pressure sensor 24 and a MAP sensor 98. Regulator controller 20 of FIG. 5 takes the form of that portion of the fuel pressure regulator 16 that responds directly to manifold absolute pressure within intake manifold 94. In other words, as manifold absolute pressure within intake manifold 94 changes, vacuum within space 80 of casement 88 for fuel pressure regulator 16 changes also. This direct relationship can be maintained to control fuel supply pressure directly in response to manifold absolute pressure. Thus, the combination of diaphragm 74, spring 82, and the varying vacuum within volume 80 of casement 88 serve as the controlling force or regulator controller to provide the variable pressure output of pressure regulator 16. Although the configuration 120 of FIG. 5 is substantially simplified relative to configuration 60 of FIG. 4, the principles of providing a signal input, i.e., manifold absolute pressure, to a regulator controller, i.e., volume 80, diaphragm 74, and spring 82, to control the variable pressure operation of fuel pressure regulator 16 is conceptually the same as that appearing in FIG. 4. The advantage of the system of FIG. 4, on the other hand, is increased flexibility and the potential to program regulator controller 20 of FIG. 4 for controlling the fuel supply pressure.

Figure 6:
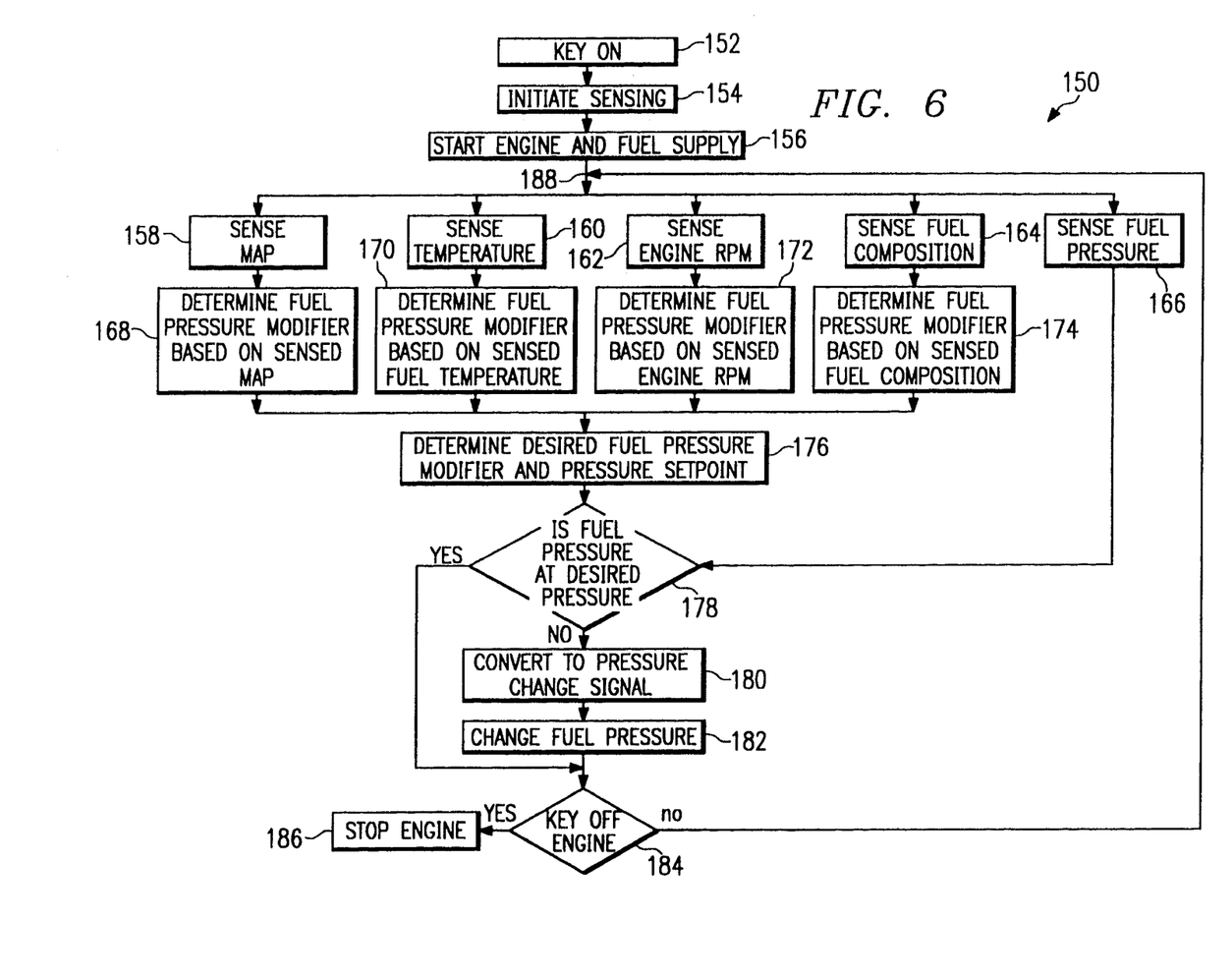
FIG. 6 illustrates a simplified flow chart of an automatic control method that employs the variable fuel pressure regulator and sensing and control concepts of the present invention.

To understand the operation of the present invention, it is important to understand the control steps that may occur in a regulator controller that controls fuel pressure regulator 16. FIG. 6, therefore, illustrates in an exemplary fashion a flow chart 150 to indicate important aspects of the control system of the present invention. Beginning at block 152, an operator may "key on" the engine. This activates the systems that support the operation of the gaseous fuel engine. After an operator keys on the engine, an associated control system begins to energize and monitor the various sensors, as block 154 indicates. Also, an engine starting system will start the engine, and the fuel metering system of the present invention will supply fuel, as block 156 shows. FIG. 6 shows blocks corresponding to some of the more important sensors that may support the operation of the system of FIG. 3. However, more or fewer sensors may be used for controlling operation of the present fuel metering system. Referring to flow chart 150, block 158 indicates manifold absolute pressure or MAP sensing, block 160 corresponds to temperature sensing, block 162 to engine RPM sensing, block 164 to fuel composition sensing, and block 166 to fuel pressure sensing.

Upon sensing the above fuel system parameters, engine 30 operation and fuel supply flow will begin as block 164 represents. Then, fuel system operation includes sensing numerous parameters in parallel. The fuel pressure regulator controlling device, whether it be electronic, mechanical, pneumatic, hydraulic, or some combination of such systems will use the sensed parameters to determine a fuel pressure modifier based on the sensed parameter. For example, as block 168 shows, the system of the present invention will determine a fuel pressure modifier based on the sensed MAP. Block 170 shows that the system will do likewise for the sensed temperature. Block 172 shows a similar operation for the sensed engine RPM measurement, and block 174 corresponds to the sensed fuel composition. A fuel pressure modifier is generally not appropriate for the sensed fuel pressure.

Figure 7A:
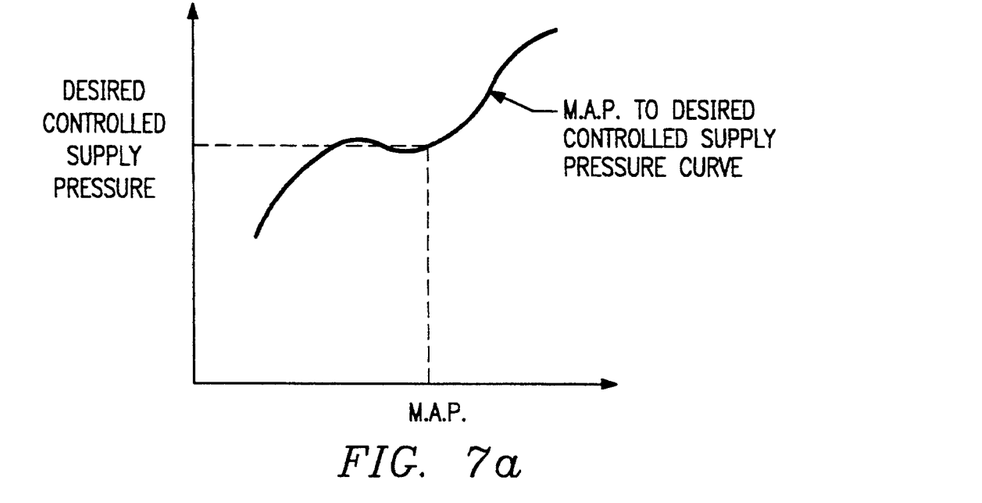
FIGS. 7a and 7b show exemplary MAP-to-desired controlled supply pressure plots for implementing certain aspects of the preferred embodiment.
Figure 7B:
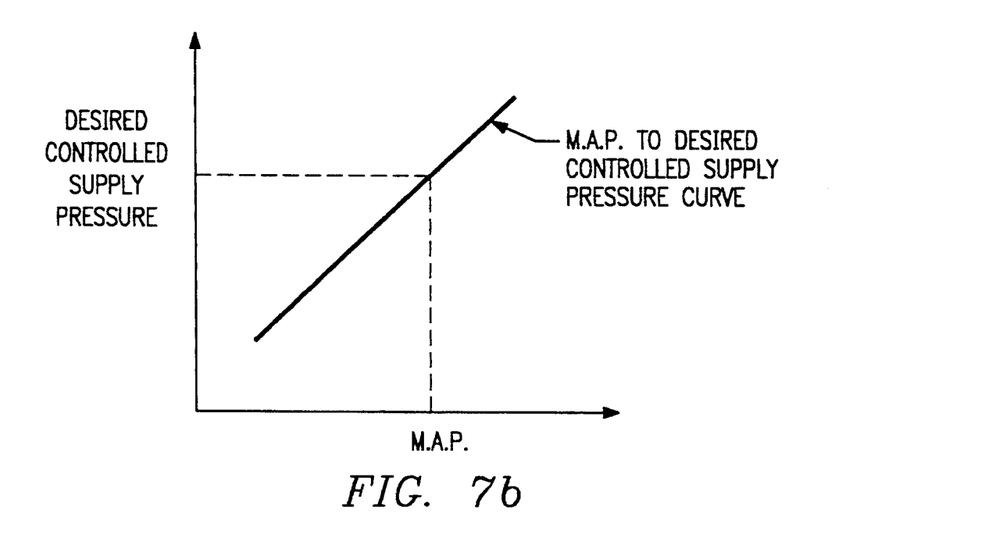

FIGS. 7a and 7b illustrate, for example, use of two alternative translation functions for determining the fuel pressure modifier corresponding to the sensed manifold absolute pressure. The curve of FIG. 7a, for example, may correspond to a non-linear function that regulator controller 20 of control configuration 60 of FIG. 4 may employ to determine a desired controlled supply pressure. Alternatively, FIG. 7b shows an essentially linear function that may more closely approximate the direct control of control configuration 120 of FIG. 5. In any event and with reference to FIG. 6, the fuel pressure modifier is the input for the next step in the process of flow chart 150.

Converting the fuel pressure modifiers from sensed MAP, sensed temperature, sensed engine RPM, and sensed fuel composition, as appropriate, to a desired fuel pressure modifier occurs at block 176. Block 176 also represents the generation of a pressure set point by regulator controller 20. Decision query 178 determines whether fuel pressure is at the desired pressure. To do this query 178 receives the sensed pressure input from the sensing that block 166 represents. If fuel pressure is not at the desired fuel pressure, then the system converts the difference between the sensed fuel pressure and the desired fuel pressure into a pressure change signal at block 180. The system then, changes the fuel pressure signal, as block 182 represents. If the desired fuel pressure equals the sensed fuel pressure, then process flow bypasses blocks 180 and 182 to proceed to query 184. At query 184, if the operator keys off the engine, then, as block 106 shows, the engine will stop. Otherwise, process flow or system operation may be considered as going to point 188 where sensing fuel flow rate parameters will continue.

Note that the above discussion of flow chart 150 of FIG. 6 is for exemplary purposes only. There are potentially unlimited variations of the flow chart 150 theme based on the number and type of sensors and form of regulator controller, as well as other specifics of a particular embodiment of the present invention. Furthermore, although the invention has been described with reference to the above-specified embodiments, this description is not meant to be construed in a limiting sense, various modifications of a disclosed embodiment, as well as alternative embodiments of the invention will become apparent to persons skilled in the art upon reference to the above description. It is therefore, contemplated that the appended claims will cover such modifications that fall within the true scope of the invention.

What is claimed is:

1. An improved gaseous fuel engine system, comprising:
   a gaseous fuel engine for receiving and using a gaseous fuel at a controlled supply pressure; and
   a fuel metering system, comprising:
      a fuel storage device for storing said gaseous fuel at a storage pressure;
      a fuel pressure regulator for receiving said gaseous fuel from said fuel storage device and dynamically reducing the pressure of said gaseous fuel from said storage pressure to said controlled supply pressure;
      at least one sensing means for generating a signal input in response to at least one sensed parameter associated with the flow rate of said gaseous fuel; and controlling means for controlling said fuel pressure regulator in response to said signal input for dynamically determining and controlling the value of said controlled supply pressure and thereby controlling the flow rate of said gaseous fuel.

2. The system of claim 1, further comprising a fuel injector associated with said gaseous fuel engine for injecting gaseous fuel into said gaseous fuel engine and working in combination with said fuel pressure regulator for controllably increasing the dynamic range of said fuel metering system.

3. The system of claim 1, wherein at least one of said sensing means comprises a pressure sensor for sensing said controlled supply pressure and further wherein said controlling means comprises fuel pressure control means for generating a signal input for controlling said fuel pressure regulator in response to the pressure of said gaseous fuel.

4. The system of claim 3, wherein at least one of said sensing means comprises a fuel temperature sensor and further wherein said controlling means comprises temperature compensation means for generating a signal input for controlling said fuel pressure regulator in response to the temperature of said gaseous fuel.

5. The system of claim 1, wherein at least one of said sensing means comprises a fuel temperature sensor and further wherein said controlling means comprises temperature compensation means for generating a signal input for controlling said fuel pressure regulator in response to the temperature of said gaseous fuel.

6. The system of claim 1, wherein at least one of said sensing means comprises a fuel composition sensor and wherein said controlling means comprises fuel composition compensation means for generating a signal input for controlling said fuel pressure regulator according to the composition of said gaseous fuel.

7. The system of claim 6, wherein at least one of said sensing means comprises a fuel temperature sensor and wherein said controlling means comprises a fuel temperature compensation means for generating a signal input for controlling said pressure regulator according to the temperature of said gaseous fuel.

8. The system of claim 7, wherein at least one of said sensing means comprises a pressure sensor for sensing said controlled supply pressure and further wherein said controlling means comprises fuel pressure control means for generating a signal input for controlling said fuel pressure regulator in response to the pressure of said gaseous fuel.

9. The system of claim 1, wherein said controlling means comprises a microprocessor for processing said signal inputs and generating therefrom a control signal for controlling said fuel pressure regulator.

10. The system of claim 1, wherein said controlling means comprises a mechanical controller for responding to a mechanical signal input and wherein said at least one sensing means generates said mechanical signal input for controlling said fuel pressure regulator.

11. The system of claim 1, wherein said controlling means comprises an electronic controller for responding to electronic signal input and wherein said at least one sensing means generates said electronic signal input for controlling said fuel pressure regulator.

12. The system of claim 1, wherein said controlling means comprises a pneumatic controller for responding to a pneumatic signal input and wherein said at least one sensing means generates said pneumatic signal input for controlling said fuel pressure regulator.

13. The system of claim 1, wherein said controlling means comprises an electro-pneumatic controller for responding to an electro-pneumatic signal input and wherein said at least one sensing means generates said electro-pneumatic signal input for controlling said fuel pressure regulator.

14. The system of claim 1, wherein said controlling means comprises an electro-mechanical controller for responding to an electro-mechanical signal input and wherein said at least one sensing means generates said electro-mechanical signal input for controlling said fuel pressure regulator.

15. The system of claim 1, wherein said controlling means comprises an electro-hydraulic controller for responding to an electro-hydraulic signal input and wherein said at least one sensing means generates said electro-hydraulic signal input for controlling said fuel pressure regulator.

16. The system of claim 1, wherein at least one of said sensing means comprises engine speed sensing means for sensing the speed of said gaseous fuel engine and wherein said controlling means comprises means for generating a signal input for controlling said fuel pressure regulator according to the speed of said gaseous fuel engine.

17. The system of claim 1, wherein at least one of said sensing means comprises manifold absolute pressure sensing means for sensing the manifold absolute pressure of said gaseous fuel engine and wherein said controlling means comprises means for generating a signal input for controlling said fuel pressure regulator in response to said manifold absolute pressure.

18. The system of claim 1, wherein at least one of said sensing means comprises a pressure sensor for sensing the pressure of said gaseous fuel and further comprising a regulator droop control circuit for determining and controlling regulator droop associated with the flow of said gaseous fuel.

19. A method for improving the supply of gaseous fuel to a gaseous fuel engine, comprising the steps of:
receiving and using in a gaseous fuel engine a gaseous fuel at a controlled supply pressure;
storing said gaseous fuel at a storage pressure in a fuel storage device;
receiving said gaseous fuel from said fuel storage device and variably reducing the pressure of said gaseous fuel from said storage pressure to said controlled supply pressure using a fuel pressure regulator;
controlling said fuel pressure regulator in response to signal inputs corresponding to said controlled supply pressure; and
generating said signal inputs in response to sensed parameters associated with said gaseous fuel.

20. The method of claim 19, further comprising the steps of injecting gaseous fuel into said gaseous fuel engine using a fuel injector associated with said fuel pressure regulator to, thereby, controllably increase the dynamic range of operation of said gaseous fuel engine system.

21. The method of claim 19, further comprising the steps of sensing said controlled supply pressure and generating a pressure compensation signal input for controlling said controlled supply pressure.

22. The method of claim 21, further comprising the steps of sensing the temperature of said gaseous fuel and generating a temperature compensation signal input for controlling said fuel pressure regulator in response to the temperature of said gaseous fuel.

23. The method of claim 19, further comprising the steps of sensing the temperature of said gaseous fuel and generating a temperature compensation signal input for controlling said fuel pressure regulator in response to the temperature of said gaseous fuel.

24. The method of claim 19, further comprising the steps of sensing the composition of said gaseous fuel and generating the composition compensation signal input for controlling said fuel pressure regulator in response to the composition of said gaseous fuel.

25. The method of claim 24, further comprising the steps of sensing the temperature of said gaseous fuel and generating a temperature compensation signal input for controlling said fuel pressure regulator in response to the temperature of said gaseous fuel.

26. The method of claim 25, further comprising the steps of sensing said controlled supply pressure and generating a pressure compensation signal input for controlling said controlled supply pressure.

27. The method of claim 19, further comprising the steps of processing said signal inputs using a microprocessor and generating a control signal for controlling said fuel pressure regulator.

28. The method of claim 19, further comprising the steps of mechanically controlling said fuel pressure regulator in response to a mechanical input signal.

29. The method of claim 19, further comprising the step of electronically controlling said fuel pressure regulator in response to an electronic input signal.

30. The method of claim 19, further comprising the step of hydraulically controlling said fuel pressure regulator in response to an hydraulic input signal.

31. The method of claim 19, further comprising the step of pneumatically controlling said fuel pressure regulator in response to a pneumatic input signal.

32. The method of claim 19, further comprising the step of electro-pneumatically controlling said fuel pressure regulator in response to an electro-pneumatic input signal.

33. The method of claim 19, further comprising the step of electro-mechanically controlling said fuel pressure regulator in response to an electro-mechanical input signal.

34. The method of claim 19, further comprising the step of electro-hydraulically controlling said fuel pressure regulator in response to an electro-hydraulic input signal.

35. The method of claim 19, further comprising the steps of sensing the speed of said gaseous fuel engine and generating from said engine speed a signal input for controlling said controlled supply pressure according to the speed of said gaseous fuel engine.

36. The method of claim 19, further comprising the step of sensing the manifold absolute pressure of said gaseous fuel engine and generating a signal input in response to said manifold absolute pressure.

37. The method of claim 19, further comprising the steps of sensing the pressure of said gaseous fuel and calculating and correcting for regulator droop associated with the flow of said gaseous fuel through said fuel pressure regulator.

38. The method of claim 21, further comprising the steps of sensing the pressure of said gaseous fuel and calculating and correcting for regulator droop associated with flow of said gaseous fuel through said fuel pressure regulator.

39. The method of claim 22, further comprising the steps of sensing the pressure of said gaseous fuel and calculating and correcting for regulator droop associated with flow of said gaseous fuel through said fuel pressure regulator.

40. The method of claim 23, further comprising the steps of sensing the pressure of said gaseous fuel and calculating and correcting for regulator droop associated with the flow of said gaseous fuel through said fuel pressure regulator.

41. An improved gaseous fuel metering system for a gaseous fuel engine, comprising:
   a fuel storage device for storing a gaseous fuel at a storage pressure;
   a fuel pressure regulator for receiving said gaseous fuel from said fuel storage device and dynamically reducing the pressure of said gaseous fuel from said storage pressure to a control supply pressure;
   at least one sensing means for generating an input signal in response to at least one sensed parameter associated with flow rate of said gaseous fuel; and
   controlling means for controlling said fuel pressure regulator in response to said signal input for dynamically determining and controlling the value of said control supply pressure and, thereby, controlling the flow rate of said gaseous fuel.

42. The system of claim 41, further comprising a fuel injector associated with said gaseous fuel engine for injecting gaseous fuel into said gaseous fuel engine and working in combination with said fuel pressure regulator for controllably increasing the dynamic range of said fuel metering system.

43. The system of claim 41, wherein at least one of said sensing means comprises a pressure sensor for sensing said controlled supply pressure and further wherein said controlling means comprises fuel pressure control means for generating a signal input for controlling said fuel pressure regulator in response to the pressure of said gaseous fuel.

44. The system of claim 43, wherein at least one of said sensing means comprises a fuel temperature sensor and further wherein said controlling means comprises temperature compensation means for generating a signal input for controlling said fuel pressure regulator in response to the temperature of said gaseous fuel.

45. The system of claim 41, wherein at least one of said sensing means comprises a fuel temperature sensor and further wherein said controlling means comprises temperature compensation means for generating a signal input for controlling said fuel pressure regulator in response to the temperature of said gaseous fuel.

46. The system of claim 41, wherein at least one of said sensing means comprises a fuel composition sensor and wherein said controlling means comprises fuel composition compensation means for generating a signal input for controlling said fuel pressure regulator according to the composition of said gaseous fuel.

47. The system of claim 46, wherein at least one of said sensing means comprises a fuel temperature sensor and wherein said controlling means comprises a fuel temperature compensation means for generating a signal input for controlling said temperature according to the composition of said gaseous fuel.

48. The system of claim 47, wherein at least one of said sensing means comprises a pressure sensor for sensing said controlled supply pressure and further wherein said controlling means comprises fuel pressure control means for generating a signal input for controlling said fuel pressure regulator in response to the pressure of said gaseous fuel.

49. The system of claim 41, wherein said controlling means comprises a microprocessor for processing said signal inputs and generating therefrom a control signal for controlling said fuel pressure regulator.

50. The system of claim 41, wherein said controlling means comprises a mechanical controller for responding to a mechanical signal input and wherein said at least one sensing means generates said mechanical signal input for controlling said fuel pressure regulator.

51. The system of claim 41, wherein said controlling means comprises an electronic controller for responding to electronic signal input and wherein said at least one sensing means generates said electronic signal input for controlling said fuel pressure regulator.

52. The system of claim 41, wherein said controlling means comprises a pneumatic controller for responding to a pneumatic signal input and wherein said at least one sensing means generates said pneumatic signal input for controlling said fuel pressure regulator.

53. The system of claim 41, wherein said controlling means comprises an electro-pneumatic controller for responding to an electro-pneumatic signal input and wherein said at least one sensing means generates said electro-pneumatic signal input for controlling said fuel pressure regulator.

54. The system of claim 41, wherein said controlling means comprises an electro-mechanical controller for responding to an electro-mechanical signal input and wherein said at least one sensing means generates said electro-mechanical signal input for controlling said fuel pressure regulator.

55. The system of claim 41, wherein said controlling means comprises an electro-hydraulic controller for responding to an electro-hydraulic signal input and wherein said at least one sensing means generates said electro-hydraulic signal input for controlling said fuel pressure regulator.

56. The system of claim 41, wherein at least one of said sensing means comprises engine speed sensing means for sensing the speed of said gaseous fuel engine and wherein said controlling means comprises means for generating a signal input for controlling said fuel pressure regulator according to the speed of said gaseous fuel engine.

57. The system of claim 41, wherein at least one of said sensing means comprises manifold absolute pressure sensing means for sensing the manifold absolute pressure of said gaseous fuel engine and wherein said controlling means comprises means for generating a signal input for controlling said fuel pressure regulator in response to said manifold absolute pressure.

58. The system of claim 41, wherein at least one of said sensing means comprises a pressure sensor for sensing the pressure of said gaseous fuel and further comprising a regulator droop determining circuit for determining regulator droop associated with the flow of said gaseous fuel.

* * * * *